March 29, 1960
C. M. ELLIS
2,930,500
CARRIER RACK FOR HEATED ASPHALT ROLLER
Filed March 10, 1958
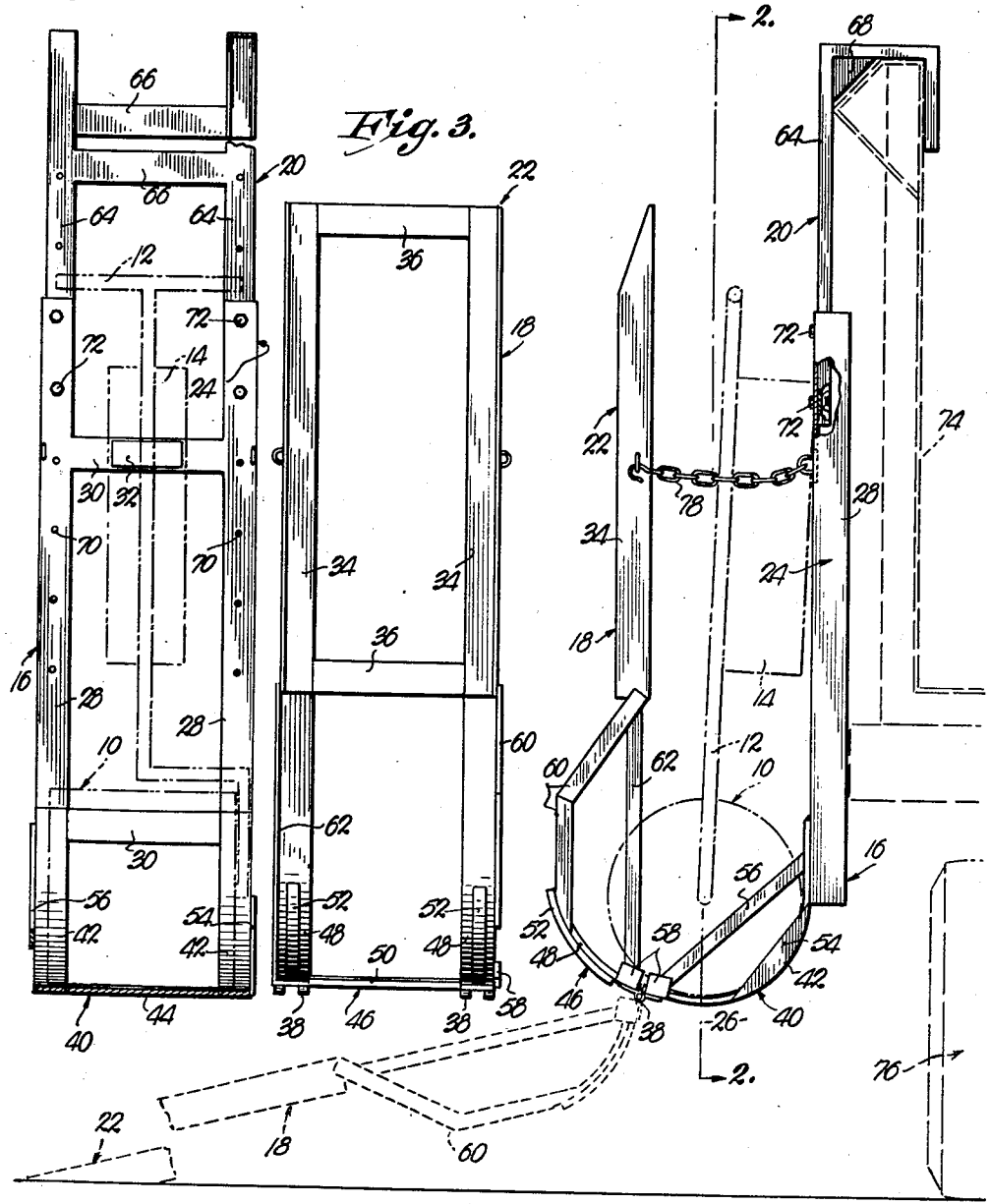
INVENTOR.
Charles M. Ellis
BY 
ATTORNEY.

2,930,500
CARRIER RACK FOR HEATED ASPHALT ROLLER

Charles M. Ellis, Liberty, Mo.

Application March 10, 1958, Serial No. 720,149

1 Claim. (Cl. 214—77)

This invention relates to a carrier particularly adapted for mounting on a vehicle such as to a side of a truck body and adapted to carry relatively heavy equipment that must be transported from place to place and quickly and easily removed and placed in use.

The most important object of the present invention is to provide a carrier in the nature of a rack composed of a pair of articulated components having the primary function of encompassing an object to be carried so as to hold the same in place, and secondarily, to present a ramp that facilitates loading and unloading of the equipment.

Other objects include the way in which novel adjusting features are incorporated in the rack adapting the same for use with various types of trucks or other vehicles; the way in which a seat is provided for the equipment carried by the rack; the way in which the ramp-forming assembly is formed to permit rolling of the equipment into the seat when the ramp assembly is raised to a normal upright position; and many important details of construction to be made clear as the following specification progresses.

In the drawing:

Fig. 1 is an end view of a carrier rack for heated asphalt rollers made pursuant to my present invention.

Fig. 2 is a vertical, cross-sectional view taken on line 2—2 of Fig. 1; and

Fig. 3 is a front elevational view of the outermost assembly of the rack.

By way of clarification, it is to be pointed out at the outset, that the carrier rack forming the subject matter of the instant invention is particularly designed to support and carry heated asphalt roller equipment such as forms the subject matter of my copending application, Serial No. 641,636, filed February 21, 1957, now abandoned.

It includes a relatively heavy, cylindrical drum 10 journalled for rotation with respect to an elongated handle 12, the latter of which in turn has a fuel tank 14 rigidly secured thereto. Manifestly, such equipment must be transported from job to job and the relatively great weight thereof presents a distinct problem insofar as loading the same to a truck or other vehicle. The rack about to be described eliminates such problems and permits loading and unloading with ease and dispatch.

To this end, the said rack includes three primary components or assemblies, namely, an innermost assembly 16, an outermost assembly 18, and an attaching or mounting assembly 20. The carrier is in the nature of a rack that is essentially U-shaped, presenting a pair of normally upright legs 22 and 24 and a bight 26.

Leg 24 consists of a frame having a pair of vertical, longitudinal members 28 interconnected by a pair of crossbars 30, the former of which is preferably provided with a thick fiber pad 32 against which the tank 14 rests.

The leg 22 is likewise in the form of a rectangular frame having a pair of longitudinal members 34 interconnected by crossbars 36.

The bight 26 is essentially arcuate from the lowermost end of the leg 22 to the lowermost end of the leg 24 and comprises a pair of articulated sections joined together by hinge means 38. Section 40 of bight 26 consists of a pair of arcuate bars 42 welded to each member 28 respectively and interconnected by a crossbar 44. Section 46 of bight 26 likewise consists of a pair of substantially arcuate bars 48 welded to the lower ends of members 34 and interconnected by a crossbar 50. Reinforcing bars 52 are provided on the outer faces of the two bars 48.

A small plate 54 is secured to one of the bars 42 and an opposed strap 56 is attached to the other of the bars 42, drum 10 being confined between the plate 54 and the strap 56 when in the position shown by dotted lines in Figs. 1 and 2. The bar 42, as well as the proximal bar 48, are additionally provided with upstanding lugs 58 adjacent the hinge means 38, and in this connection, it is understood that there are two hinges 38, each connecting one of the bars 42 with the corresponding bar 48.

Bars 60 are attached to the bar 48 corresponding to bar 42, and a normally vertical strap 62 in opposed relationship to the bars 60, spans the distance between the lower end of leg 22 and the inner end of section 46 adjacent hinge means 38.

Assembly 20 includes a pair of inverted, J-shaped hook members 64 interconnected by crossbars 66 and braced by gussets 68. A row of openings 70 in each member 28 respectively, permits adjustment between the assemblies 16 and 20, through the medium of bolts 72. It is noted in Fig. 1 of the drawing that through the medium of the hook assembly 20, the rack may be suspended from one side 74 of a truck or other vehicle 76. A pair of chains 78 releasably interconnect the assemblies 16 and 18 to hold the latter in the position shown in Fig. 1 when the equipment 10—12—14 is supported by the rack.

It is seen that, by virtue of the hinge means 38, the assembly 18 may be swung to the dotted-line position of Fig. 1 presenting a ramp along which the drum 10 may be rolled upwardly for loading purposes. As the drum 10 reaches the upper end of the leg 22, it rolls into the arcuate section 46 of bight 26 where it is retained until an operator can lift the assembly 18 upwardly to the position shown by full lines in Fig. 1

During such lifting, the handle 12 rests on the members 34 and the lifting action rolls the drum 10 from within the bight section 46 into the bight section 40 where the drum 10 becomes seated and is maintained until the operator is able to fasten the chains 78. In this respect, it is to be noted that the upwardly-facing disposition of the bight section 40, nests the drum 10 in a manner to prevent its rolling downwardly toward the bight section 46, thereby rendering the fastening of the chain 78 an easy task.

Conversely, when the equipment is to be unloaded, it is but necessary to swing the assembly 18 to the dotted line position shown in Fig. 1, the drum 10 being retained by the arcuate section 40 until the operator, grasping the handle 12, pulls the drum 10 downwardly out of its seated relationship to the bight section 40 and into the arcuate section 46. Thereupon, the drum 10 can be rolled upwardly and outwardly out of the bight section 46 onto the legs 22 where drum 10 may be rolled downwardly toward the ground.

Obviously, depending upon the height of the side 74 of truck 76, the adjustment between the assemblies 16 and 20 should be such as to provide adequate clearance between the bight 26 and the ground and at the same time assure that the assembly 18 will rest upon the ground when swung to the ramp-producing position shown by dotted lines in Fig. 1.

Having thus described the invention what is claimed as new and desired to be secured by Letters Patent is:

A carrier comprising a substantially U-shaped rack, presenting a pair of upstanding legs and a bight joining the legs at their lowermost ends; means on one of the legs for mounting the carrier on a supporting vehicle with the bight elevated above the ground, said bight having a pair of arcuate, articulated sections, permitting swinging of the other leg to the ground, presenting an inclined ramp for rolling a cylindrical object upwardly into the bight section of said other leg; and means releasably interconnecting the legs for preventing said swinging of the other leg, the bight section of the one leg facing upwardly for receiving said object in seated relationship thereto when the other leg is raised to roll the object from the bight section of the other leg into the bight section of said one leg.

References Cited in the file of this patent

UNITED STATES PATENTS

| Number | Name | Date |
|---|---|---|
| 948,159 | Brown | Feb. 1, 1910 |
| 1,327,834 | Long | Jan. 13, 1920 |
| 1,385,909 | Faillace | July 26, 1921 |
| 1,396,420 | Glinchikoff | Nov. 8, 1921 |
| 1,425,999 | Morrow | Aug. 15, 1922 |
| 1,520,175 | Collins | Dec. 23, 1924 |
| 2,161,734 | Wheless | June 6, 1939 |